United States Patent
Guarneri et al.

(10) Patent No.: US 10,551,934 B2
(45) Date of Patent: Feb. 4, 2020

(54) GESTURE RECOGNITION METHOD, APPARATUS AND DEVICE, COMPUTER PROGRAM PRODUCT THEREFOR

(71) Applicant: STMicroelectronics S.r.l., Agrate Brianza (IT)

(72) Inventors: Nunziata Ivana Guarneri, Caltanissetta (IT); Alessandro Capra, Tremestieri Etneo (IT)

(73) Assignee: STMICROELECTRONICS S.R.L., Agrate, Brianza (IT)

( * ) Notice: Subject to any disclaimer, the term of this patent is extended or adjusted under 35 U.S.C. 154(b) by 179 days.

(21) Appl. No.: 15/889,859

(22) Filed: Feb. 6, 2018

(65) Prior Publication Data

US 2018/0164894 A1  Jun. 14, 2018

Related U.S. Application Data

(62) Division of application No. 14/450,105, filed on Aug. 1, 2014, now Pat. No. 9,910,503.

(30) Foreign Application Priority Data

Aug. 1, 2013 (IT) .............................. TO2013A0659

(51) Int. Cl.
*G06F 3/01* (2006.01)
*G06F 3/041* (2006.01)
(Continued)

(52) U.S. Cl.
CPC .............. *G06F 3/017* (2013.01); *G06F 3/044* (2013.01); *G06F 3/0416* (2013.01); *G06F 3/04883* (2013.01); *G06F 2203/04108* (2013.01)

(58) Field of Classification Search
CPC ........................................................ G06F 3/017
(Continued)

(56) References Cited

U.S. PATENT DOCUMENTS 8,208,380 B1    6/2012  Nachum et al.
8,305,357 B2 *  11/2012  Liao ...................... G06F 3/0416
                                                                    345/173
(Continued)

FOREIGN PATENT DOCUMENTS

CN      103139627 A       6/2013
TW      201324245 A       6/2013
WO      2013/009335 A1    1/2013

OTHER PUBLICATIONS

Search Report for Italian Application No. TO20130659, Ministero dello Sviluppo Economico, The Hague, dated Mar. 11, 2014, 2 pages.

(Continued)

*Primary Examiner* — William D Titcomb
(74) *Attorney, Agent, or Firm* — Seed Intellectual Property Law Group LLP

(57) ABSTRACT

Hand gestures, such as hand or finger hovering, in the proximity space of a sensing panel are detected from X-node and Y-node sensing signals indicative of the presence of a hand feature at corresponding row and column locations of a sensing panel. Hovering is detected by detecting the locations of maxima for a plurality of frames over a time window for sets of X-node and Y-node sensing signals by recognizing a hovering gesture if the locations of the maxima detected vary over the plurality of frames for one of the sets of sensing signals and not for the other of set. Finger shapes are distinguished over "ghosts" generated by palm or fist features by transforming the node-intensity representation for the sensing signals into a node-distance represen- (Continued)

tation based on distances of detection intensities for a number of nodes under a peak for a mean point between valleys adjacent to the peak.

20 Claims, 10 Drawing Sheets

(51) Int. Cl.
  *G06F 3/044* (2006.01)
  *G06F 3/0488* (2013.01)
(58) Field of Classification Search
  USPC ........................................................ 715/863
  See application file for complete search history.

(56) References Cited

U.S. PATENT DOCUMENTS

| | | | | |
|---|---|---|---|---|
| 8,363,031 | B2* | 1/2013 | Geaghan | G06F 3/044 |
| | | | | 178/18.06 |
| 8,624,866 | B2* | 1/2014 | Chang | G06F 3/044 |
| | | | | 178/18.06 |
| 8,654,089 | B2* | 2/2014 | Chou | G06F 3/0416 |
| | | | | 345/173 |
| 8,922,496 | B2* | 12/2014 | Chen | G06F 3/0416 |
| | | | | 345/173 |
| 8,982,061 | B2* | 3/2015 | Zhao | G06F 3/041 |
| | | | | 345/173 |
| 2005/0175012 | A1* | 8/2005 | Gupta | H04L 1/1809 |
| | | | | 370/394 |
| 2007/0103431 | A1 | 5/2007 | Tabatowski-Bush | |
| 2009/0115721 | A1 | 5/2009 | Aull et al. | |
| 2009/0284495 | A1 | 11/2009 | Geaghan et al. | |
| 2010/0102941 | A1 | 4/2010 | Richter et al. | |
| 2010/0218231 | A1 | 8/2010 | Frink et al. | |
| 2011/0026645 | A1 | 2/2011 | Luo et al. | |
| 2011/0032210 | A1* | 2/2011 | Chou | G06F 3/0416 |
| | | | | 345/174 |
| 2011/0254765 | A1 | 10/2011 | Brand | |
| 2012/0218406 | A1 | 8/2012 | Hanina et al. | |
| 2012/0274550 | A1 | 11/2012 | Campbell et al. | |
| 2013/0016045 | A1* | 1/2013 | Zhao | G06F 3/0416 |
| | | | | 345/173 |
| 2013/0106792 | A1 | 5/2013 | Campbell et al. | |
| 2013/0110804 | A1 | 5/2013 | Davis et al. | |
| 2013/0111414 | A1 | 5/2013 | Ho et al. | |
| 2013/0241837 | A1 | 9/2013 | Oga | |
| 2014/0172434 | A1* | 6/2014 | Price | G10L 19/167 |
| | | | | 704/500 |
| 2014/0368422 | A1 | 12/2014 | Gupta et al. | |

OTHER PUBLICATIONS

Search Report for Italian Application No. TO20130657, Ministero dello Sviluppo Economico, The Hague, dated Mar. 11, 2014, 2 pages.

* cited by examiner

GESTURE RECOGNITION METHOD, APPARATUS AND DEVICE, COMPUTER PROGRAM PRODUCT THEREFOR

PRIORITY CLAIM

The instant application is a divisional of U.S. patent application Ser. No. 14/450,105, filed 1 Aug. 2014, which claims priority to Italian Patent Application No. TO2013A000659, filed 1 Aug. 2013, which application is incorporated herein by reference in its entirety.

RELATED APPLICATION DATA

The present application is related to commonly assigned and copending U.S. patent application Ser. No. 14/450,088, entitled GESTURE RECOGNITION METHOD, APPARATUS AND DEVICE, COMPUTER PROGRAM PRODUCT THEREFOR, and filed on 1 Aug. 2014, which application is incorporated herein by reference in its entirety.

TECHNICAL FIELD

The disclosure relates to gesture recognition.

One or more embodiments may relate to gesture recognition in, e.g., self-sensing capacitive display devices.

SUMMARY

Self-sensing capacitive display devices may be useful in providing intuitive interfaces between a user and "touch-screen" based devices.

While the action of "touch" is currently referred to, interaction with such devices may involve certain gestures such as e.g., flip, pinch, rotation, and so on by a user, which gestures are in fact performed in the proximity space of the device (e.g., a panel such as a screen) without the device being actually touched by the user.

Display panels able to capture gestures performed in the proximity space (e.g., by "hovering" at a distance from the display-panel surface without actually touching it) may be of interest for a number of applications such as "swipe" (e.g., for an e-reader), using a finger as a joystick (e.g., for gaming purposes), "pinching" (e.g., for drag-and-drop operations), rotation (e.g., of an object), and zoom-in or zoom-out (e.g., for graphics and imaging applications).

An increasing sensitivity can also be traced in certain markets for the "hygienic" nature of touch-less operation, where no undesired traces of a user's fingers may remain on the panel.

The need is therefore felt for improved solutions for gesture recognition, for instance, in order to further expand the capability for a touch-less mode of operation.

One or more embodiments aim at satisfying such a need.

One or more embodiments may also relate to corresponding apparatus, a related touch-based device, as well as a related computer-program product, loadable in the memory of at least one computer device and including software code portions for performing the steps of a method of the embodiments when the product is run on such a device. As used herein, reference to such a computer-program product is intended to be equivalent to reference to a computer-readable medium containing instructions for controlling an electronic device to coordinate the performance of an embodiment. Reference to "at least one computer" is intended to highlight the possibility for certain embodiments to be implemented in a distributed/modular fashion.

One or more embodiments make it possible to recognize the direction of a hovering gesture performed with hand(s) or finger(s), with the possibility of providing hand-presence recognition.

One or more embodiments make it possible to distinguish "finger" and "non-finger" gestures.

One or more embodiments may involve a temporal analysis of coordinates detected for each frame in an image/frame sequence.

One or more embodiments may involve the use of a circular buffer (e.g., for the X and Y axes of a Cartesian coordinate system) in detecting hovering gestures performed with hand(s) and with one or more fingers.

BRIEF DESCRIPTION OF THE DRAWINGS

One or more embodiments will now be described, by way of example only, with reference to the annexed figures, wherein.

DETAILED DESCRIPTION

Illustrated in the following description are various specific details aimed at an in-depth understanding of various exemplary embodiments. The embodiments may be obtained without one or more specific details, or through other methods, components, materials etc. In other cases, known structures, materials or operations are not shown or described in detail to avoid obscuring the various aspects of the embodiments. Reference to "an embodiment" in this description indicates that a particular configuration, structure or characteristic described regarding the embodiment is included in at least one embodiment. Hence, expressions such as "in an embodiment", possibly present in various parts of this description do not necessarily refer to the same embodiment. Furthermore, particular configurations, structures or characteristics may be combined in any suitable manner in one or more embodiments.

References herein are used for facilitating the reader's comprehension and thus they do not define the scope of protection or the range of the embodiments.

Figure 1:
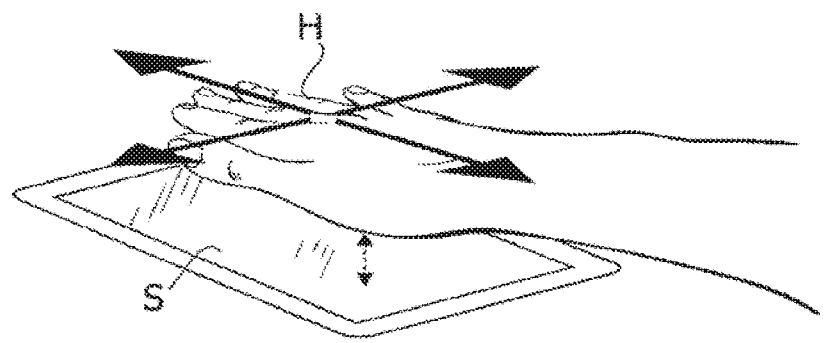
FIGS. 1 and 2 are exemplary of hovering gestures adapted to be recognized in embodiments.
Figure 2:
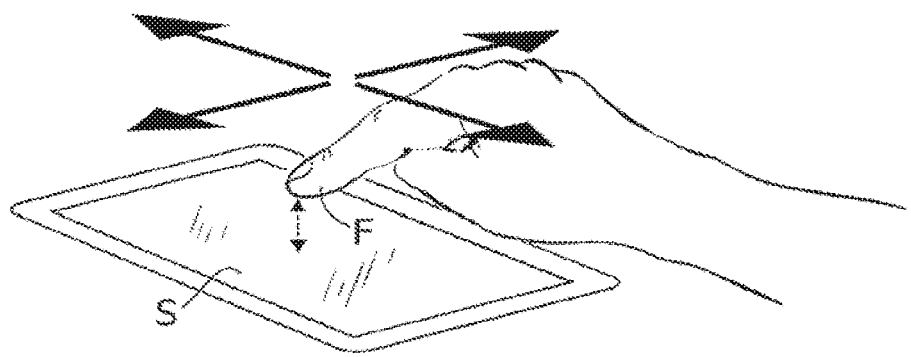

FIGS. 1 and 2 are representative of hovering gestures adapted to be detected in one or more embodiments.

Such gestures may be detected, e.g., with respect to a panel S such as, e.g., a display screen of the so-called self-sensing type, that is a sensing screen adapted for use in touch-screen-based devices.

In one or more embodiments, such a panel S may be based on a capacitive technology, and may produce output signals indicative of the position, with respect to (the plane of) the screen, of a user's hand/s or finger/s "hovering" at a distance over the panel surface.

One or more embodiments may refer to the capability of such a panel (e.g., a self-sensing screen of any known type in the art) to operate in a touch-less mode, namely by outputting signals indicative of the position of a user's hand/finger even in the absence of physical contact with the panel surface in a "hovering" mode.

In one or more embodiments, such sensing action may be provided at distances to the panel surface up to approximately 3 centimeters (cm). Panels capable of providing a proximity sensing action up to approximately 10 centimeters (cm) from the panel surface are known in the art.

FIG. 1 is generally representative of a "hand" hovering gesture, namely of a user's hand H being moved up, down, right, and left as schematically indicated by the harrows in FIG. 1 while hovering over the panel surface.

FIG. 2 is similarly representative of a "finger"-hovering gesture namely of a user's finger F being moved up, down, right, and left as schematically indicated by the harrows in FIG. 2 while hovering over the panel surface.

For the sake of simplicity, panels (e.g., capacitive self-sensing screens) S having a square/rectangular shape with sides extending in the directions of the axes X, and Y of a Cartesian system will be assumed throughout this description. One or more embodiments may involve screens having a shape other than quadrangular/rectangular such as round, elliptical, polygonal, and others.

Figure 3:
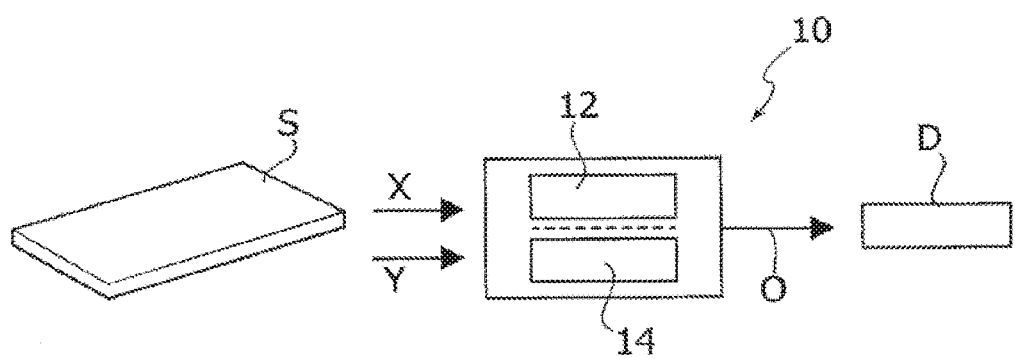
FIG. 3 is an exemplary block diagram of an apparatus according to embodiments.
Figure 4:
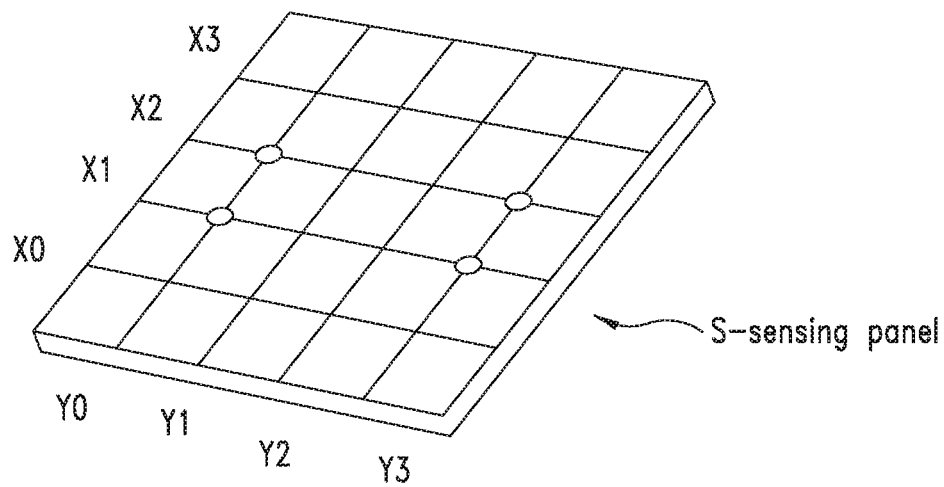
FIG. 4 is exemplary of a sensing panel which may be used in embodiments.

FIG. 3 is a block diagram representative of an apparatus according to embodiments, generally designated 10. In one or more embodiments, apparatus 10 may be configured to process sensing signals from a sensing panel S as discussed in the foregoing. In one or more embodiments, such signals may be assumed to include first and second signals representative of sensing actions performed, as better detailed in the following, for the orthogonal axes X and Y of a (plane) Cartesian system or space.

Apparatus 10 may be any processing device (e.g., a microprocessor) configured to perform the processing functions exemplified in the following in order to produce an output signal O to be made available to a "destination" block or function D. Such block or function may be any module/function intended to be controlled via a hand/finger hovering gesture such as, e.g., a hovering (that is touch-less) action performed by a user with respect to the panel S.

The combination of the panel S, apparatus 10, and a destination module/function D shown in FIG. 3 is intended to be generally representative of any device (e.g., a user equipment in a mobile-communication network) adapted to be actuated/controlled by means of user gestures as exemplified herein.

In one or more embodiments, circular buffers 12 and 14 may be used to store the signals related to the "X nodes" (axis X) and the "Y nodes" (axis Y) from the panel S.

In one or more embodiments, the circular buffers 12, 14 may be configured to store a certain number (e.g., 10) of "frames" for the X nodes and the Y nodes. In one or more embodiments, the circular buffers 12, 14 may be updated each time a new frame is read from the panel S.

As used herein, the designation "circular" applies because, e.g., after computing the maximum value on each column of the circular buffer, the first row (line) in the buffer may be discarded from the buffer with all the frames shifted one position (e.g., one position up, with the second frame becoming the first one and so on), while the frame being currently read is loaded in the newest (e.g., latest) position of the circular buffer.

In the prevailing approach used in touch-screens operating in a touch mode (with physical contact of, e.g., a finger with the screen surface) signals from a screen S may relate to each intersection of rows (lines) and columns in the panel, whereby the (actual) touching action produces unique touch-coordinate pairs.

In one or more embodiments, signals from a panel S as considered in the following may relate individually to row (line) and column electrodes in the panel S.

For instance, in one or more embodiments as exemplified in the following, for each frame (e.g., for each subsequent "image" of the hand/finger gesture detected by the panel S), signals for the X nodes and Y nodes will be issued in the form of sequences of values representative of the intensity of the sensing (e.g., capacitance) signals for the X nodes and Y nodes.

In one or more embodiments, a hand-feature gesture in the proximity space of a sensing panel S may thus be recognized detecting X-node and Y-node sensing signals X, Y indicative of the presence of a hand feature at corresponding row (line) locations and column locations of the sensing panel S.

As used herein, the term "hand feature" will generally designate a hand as a whole, a single finger or plural fingers, as well as a palm or fist "ghost".

Figure 5:
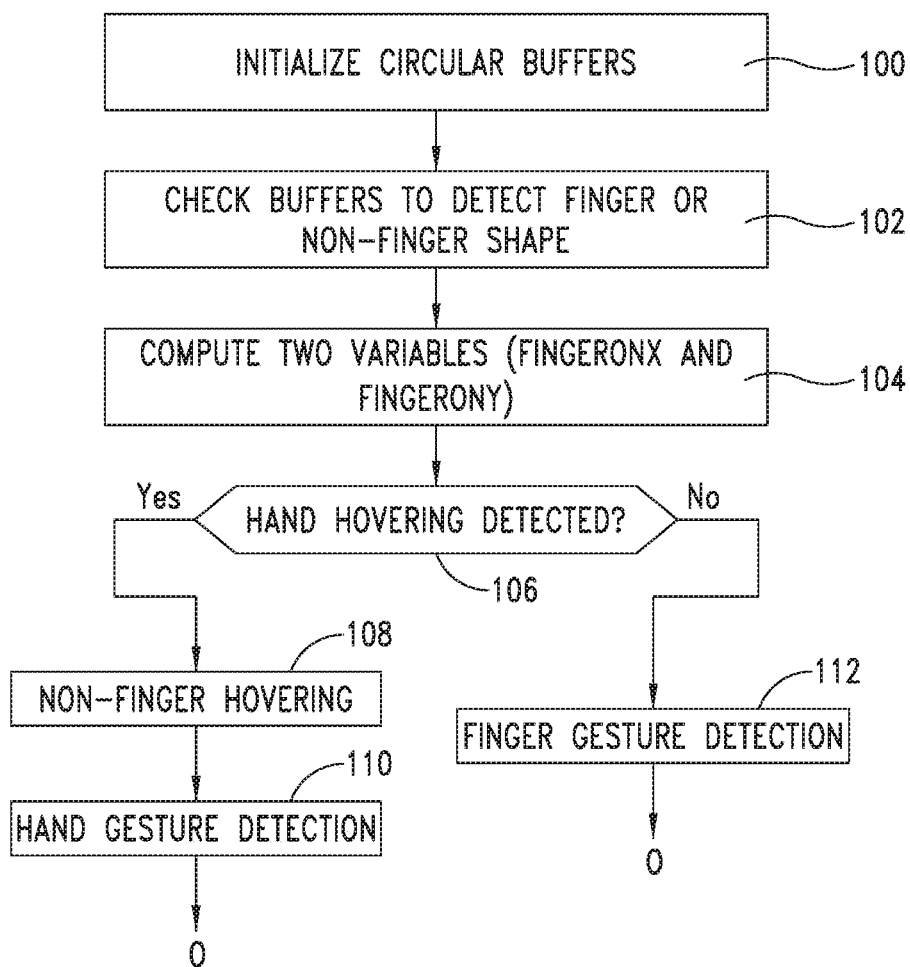
FIG. 5 is an exemplary flow chart of possible operation of embodiments, FIG. 6, including three portions designated a), b) and c), FIG. 7, including two portions designated a) and b) and FIG. 8 are diagrams exemplary of hovering detection in embodiments, FIGS. 9 and 10, each including three portions designated a), b) and c), are exemplary of hand-hovering detection in embodiments, FIGS. 11 and 12, again including each three portions designated a), b) and c), are exemplary of finger-hovering detection in embodiments, FIGS. 13, 14 and 15, these latter including two portions designated a) and b) are exemplary of finger coordinate detection in embodiments.

The flow chart of FIG. 5 is exemplary of one or more embodiments wherein the signals related to the X axis or the Y axis from the panel S may be processed to ascertain whether a "hand"-hovering gesture (FIG. 1) or a "finger"-hovering gesture (FIG. 2) is being effected in the proximity space of the panel S.

In the flow chart of FIG. 5, the block 100 is representative of the initialization of the two circular buffers 12 (e.g., X-axis or CBX) and 14 (e.g., Y-axis or CBY), e.g.:

CBX=[10 frames for X]

CBY=[10 frames for Y].

Step 102 is representative of a check made for each frame stored in the two CBX and CBY buffers 12 and 14 as to whether a "finger" or "non-finger" shape has been detected.

In one or more embodiments, this may occur by using the approach described in the following with reference to FIGS. 13 to 24.

In a step 104, two variables may be computed, namely FingersOnX and FingersOnY which may assume two values e.g., "0" or "1".

In one or more embodiments, these variables may be set to "1" if in at least one frame of the respective buffer a finger presence has been detected, and set to "0" otherwise.

For instance, FingersOnX may be set to 0 when in any of the frames of the CBX buffer 12 a non-finger shape has been detected while FingersOnX is set to 1 when a finger shape has been detected in at least one frame of the CBX buffer 12. The same may apply mutatis mutandis for the Y axis, namely the CBY buffer 14.

In a step 106 the values assigned to FingerOnX and FingerOnY are checked to distinguish hand hovering from finger hovering.

In case a hand-hovering gesture is detected, in one or more embodiments slant parameters SlantX, SlantY may be computed for the X and the Y axis, respectively, as better detailed in the following, e.g., by analysing the way (i.e., the temporal order) the X nodes and the Y nodes of the sensor panel S reached their maximum values.

In one or more embodiments, in a step 110 values for SlantX and SlantY may be checked (positive/negative/zero) as detailed in the following by outputting (e.g., as the output signal O) the direction of hand hovering (up, down, right, left).

In one or more embodiments, if—based on the check of step 106—a finger shape is determined, a finger hovering gesture may be processed, e.g., by analyzing the temporal evolution of the finger coordinate values based on the frames stored in the circular buffers 12 and 14 as better detailed in the following by outputting (e.g., as the output signal O) the direction of finger hovering (up, down, right, left).

In one or more embodiments, the sets of X-node and Y-node sensing signals for a plurality of frames over a time window may be checked (searched) for the presence of at least one finger shape, and in the absence of finger shapes, gestures detected, e.g., as detailed in the following, may be recognized as hand (hovering) gestures.

Figure 6:
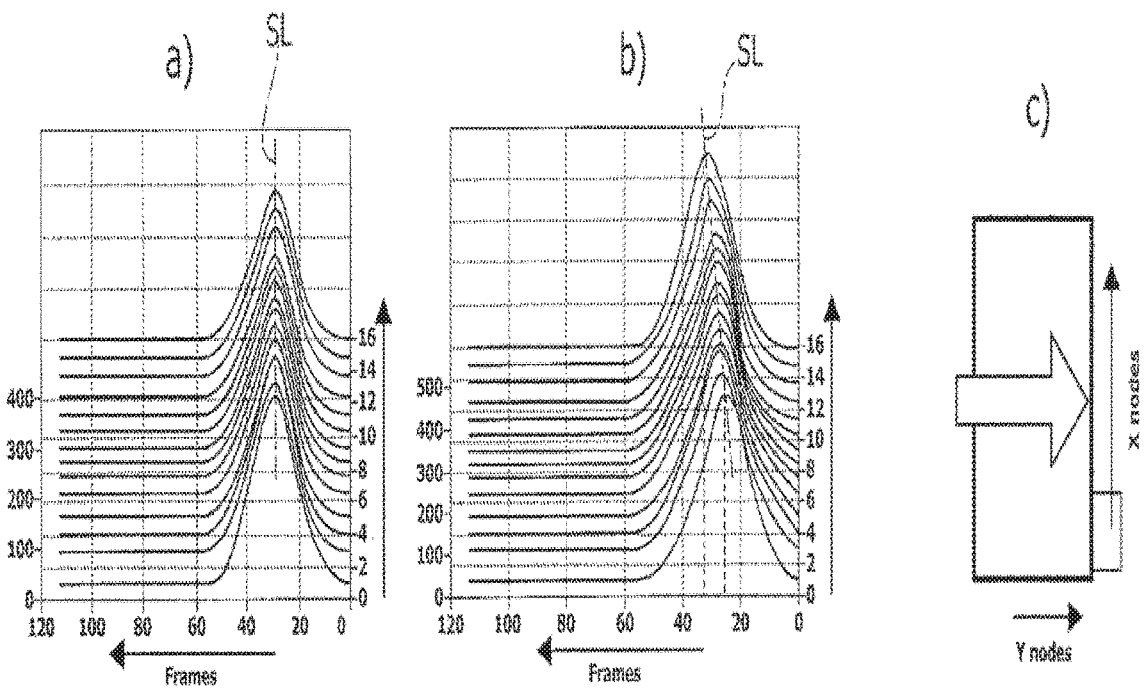

FIG. 6 is generally exemplary of the possibility, in one or more embodiments, to detect a hovering gesture by analyzing the signals relative to the X axes (e.g., rows) or the Y axes (e.g., columns) as produced by the sensing panel (e.g., self-sensing capacitive screen) S. In one or more embodiments, the panel S may measure a (e.g., capacitance) sensing a signal individually for each row (line) and column electrode to produce signals indicative of the temporal evolution over time (e.g., over a plurality of subsequent frames) of the sensing signals (capacitance values) relative to X nodes (X-axis) and Y nodes (Y-axis).

Portion a) of FIG. 6 shows a possible exemplary evolution over a plurality of frames (abscissa scale, from right to left) of sensing (e.g., capacitance) values related to the X nodes (ordinate scale, 16 nodes are considered by way of example).

Portion b) of FIG. 6 similarly shows a possible exemplary evolution over a plurality of frames (abscissa scale, from right to left) of sensing (e.g., capacitance) values related to the Y nodes (ordinate scale, 16 nodes are again considered by way of example).

The signals exemplified in portions a) and b) for the X nodes and the Y nodes may relate to a right-wise hovering movement (gesture) as shown in part c) FIG. 6.

One may thus note that with such a horizontal hovering movement, the signals for the X nodes are substantially the same for each frame, which may be explained by observing that during such a hovering movement in the direction of the Y-axis does not entail any appreciable change over time of the signals for the X nodes shown in portion a) of FIG. 6, that all show, e.g., one peak value at substantially the same position for all the frames.

Conversely, during such a hovering movement in the direction of the Y-axis, the signals for the Y nodes shown in portion b) of FIG. 6 do change over the frames: e.g., the lower index nodes (1, 2, . . . ) have a peak value of the sensing signal approximately at frame 22, while higher index nodes ( . . . , 15, 16) reach their peak value at about frame 32.

While a peaked signal (which may be exemplary of a finger hovering) is exemplified in FIG. 6, a similar behavior of the sensing signals over subsequent frames may be detected also for hand hovering.

The slant or slope of a line SL joining the maxima detected over a time window of subsequent frames for the signals for the X nodes and the Y nodes as, e.g., stored in the circular buffers 12 and 14 (CBX, CBY) may thus be representative of a hovering movement and the associated parameters of such a movement.

For instance, in portion a) of FIG. 6 (X nodes—with no hovering in the X direction) the curve SL is directed vertically; conversely, in portion b) of FIG. 6 (Y nodes—with hovering taking place in the Y direction) the curve SL is inclined to the vertical. Also, the direction of slant (the curve SL being inclined left-wise or right-wise to the vertical) may be indicative of the direction of hovering and the amount of inclination (e.g., angle to the vertical) may be representative of the speed of transition over nodes, that is, the speed of the hovering movement.

Figure 7:
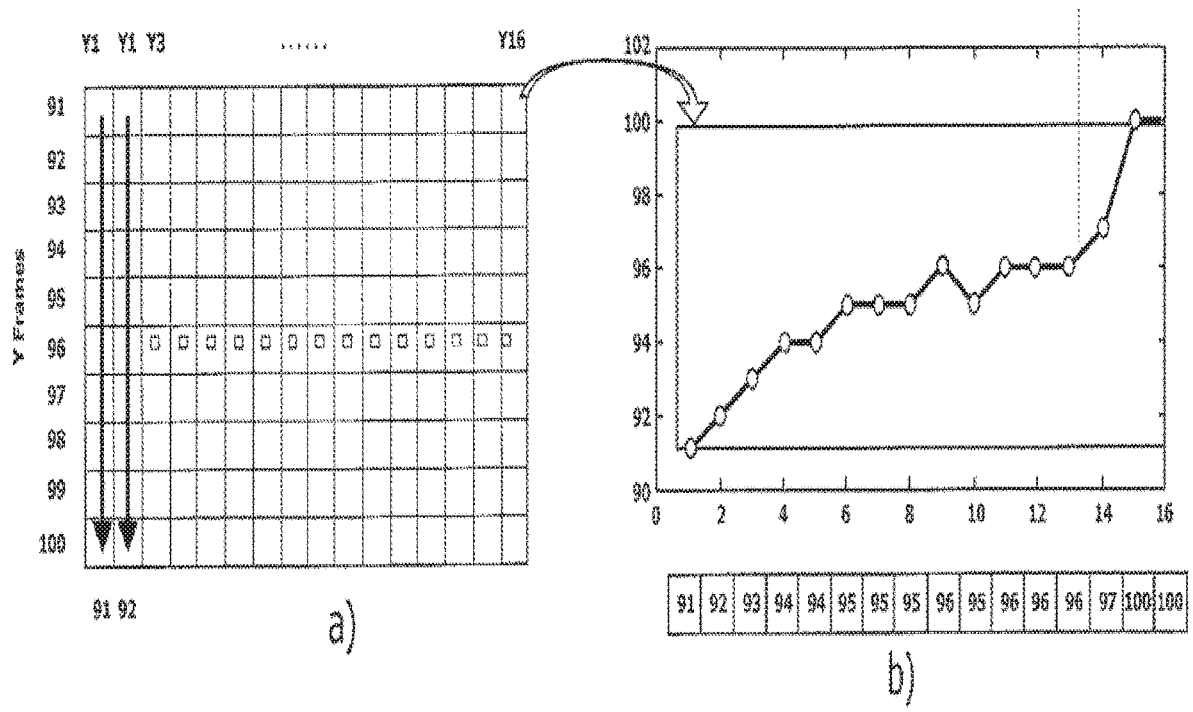
Figure 8:
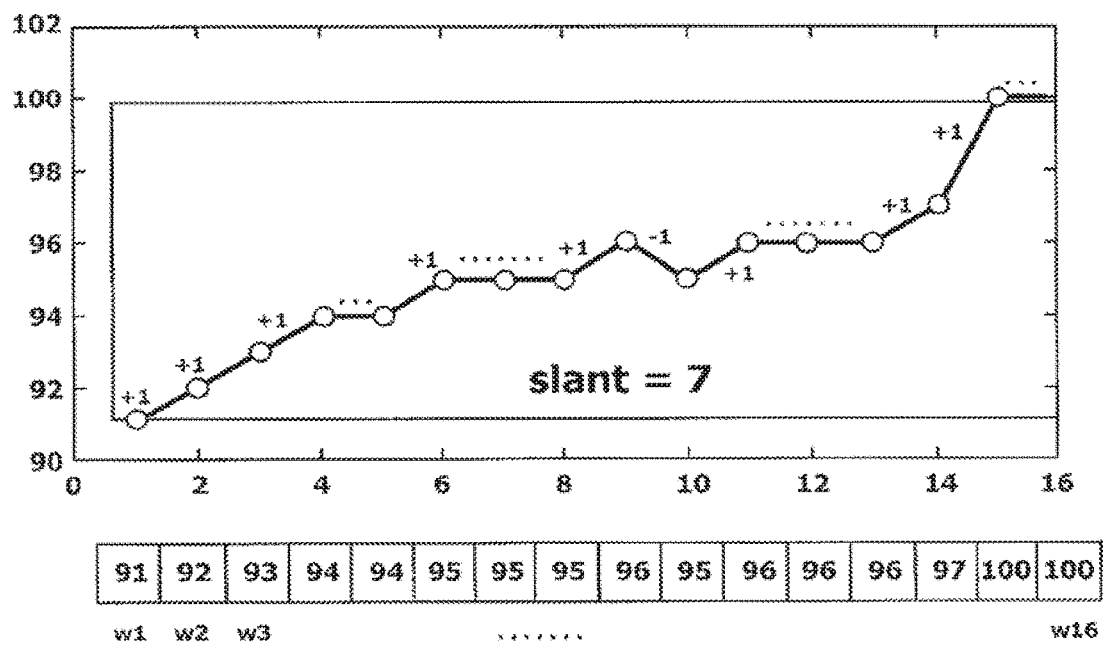

FIGS. 7 and 8 are exemplary of one or more embodiments wherein the criteria exemplified in FIG. 6 may be used to determine slant values adapted to provide an indication of hovering movements, e.g., in terms of:

hovering/no hovering in the direction of the X axis or the Y axis, the direction (sense) of the hovering movement (e.g., up or down, right or left), and the speed of the hovering movement.

Embodiments of functions to distinguish hand hovering and finger hovering will be exemplified in the following with reference to FIGS. 13 to 24.

Portion a) FIG. 7 is exemplary of how the detection or sensing (e.g., capacitance) signals from the panel S may be stored in the circular buffers 12, 14.

FIG. 7 refers by way of example to signals for the Y nodes Y1, Y2, Y3 . . . , Y16 (the number of nodes, which may be different for the two axes X and Y, is purely exemplary and not limiting of the embodiments) which are arranged in subsequent lines of e.g., the buffer 14 of FIG. 1.

In one or more embodiments, such a buffer may include e.g., ten lines for storing information concerning ten subsequent frames, that is, subsequent "images" of a hovering gesture subsequently detected by the sensing panel S. The indicated number of frames/storing locations for the circular buffers, which may be different for the two axes X and Y, is merely exemplary and not limiting of the embodiments.

In one or more embodiments, a value of 10 or about 10 frames was found to represent a judicious trade-off in terms of providing a sufficiently wide "time window" for detection purposes and computational complexity/storage requirements, the same possibly also applying to selecting the sets of X-node sensing signals X and Y-node sensing signals Y to relate each to 16 or about 16 nodes.

FIG. 7 may refer to an exemplary case where a first Y node Y1 reaches its maximum of the sensing (e.g., capacitance) value at frame 91, while the second node Y2 reaches such maximum at frame 92, the third node Y3 at frame 93 and so on. That may be an exemplary case where the maximum of the detection (or sensing) signal goes over time from lower index Y nodes to higher index Y nodes (which may correspond, e.g., to right-wise hovering), as schematically plotted in portion b) of FIG. 7, where the dots represent the maxima for each column, plotted in terms of frame index (ordinate scale) versus the Y nodes/sensors.

FIG. 8 is exemplary of how a slant parameter may be calculated for signals as presented in FIG. 7 based on a procedure where, e.g., starting from the first node (e.g., Y1) the frame index of the maximum is compared with the successive one, and:
- if the current index is lower than the next one, the value for the slant parameter is increased, e.g., by one unit;
- if the current index is higher than the next one, the value for the slant parameter is decreased, e.g., by one unit; and
- if the current index is identical to the next one the value for the slant parameter is left unchanged.

The following routine is exemplary of a possible embodiment of such a procedure:

```
slant = 0;
for (i = 1; i ≤ 16; i++)
{if (w(i) > w(i+1))
slant – ;
else if (w(i) < w (i+1))
slant ++;}
```

The slant parameter having a value different from 0 may be generally indicative of a hovering movement being in progress.

In one or more embodiments, the magnitude (e.g., absolute value or module) of the slant parameter may be compared with a threshold, with hovering actually declared only if such a threshold is reached.

One or more embodiments may thus involve comparing the locations of the maxima of the sets of X-node and Y-node sensing signals derived from the panel S against a displacement threshold, and evaluating said locations of the maxima as remaining stationary if said displacement threshold is not reached.

In one or more embodiments, such a thresholding action (which may be against a variable threshold) may avoid false positives being generated for a user's hand or finger shaking not intended to represent a hovering gesture proper.

In one or more embodiments, the sign the slant parameter (positive or negative) may be indicative of the direction of the hovering movement e.g., up or down for X nodes or right-wise or left-wise for Y nodes.

Figure 9:
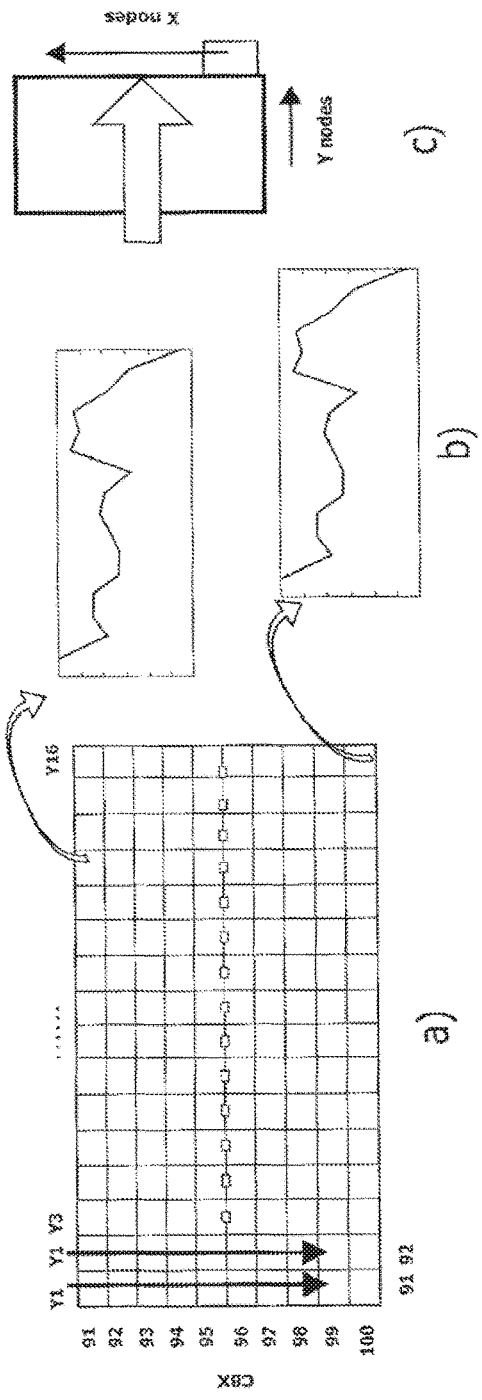
Figure 10:
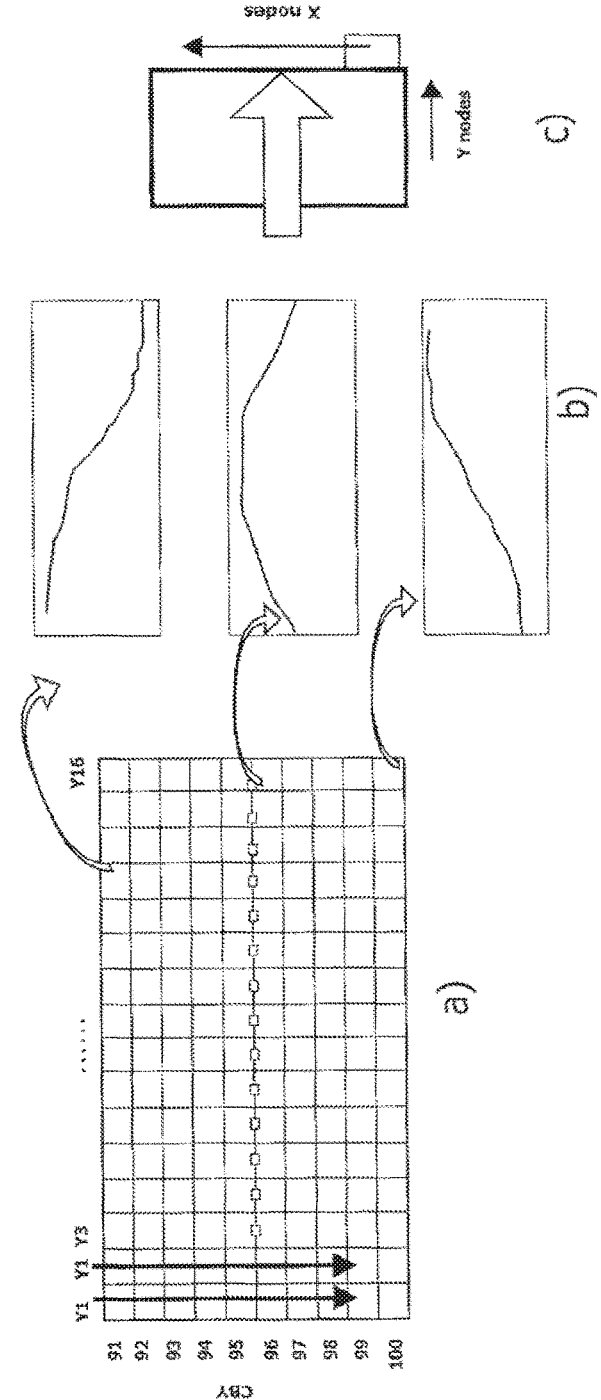

FIGS. 9 and 10 are exemplary one or more embodiments where the mechanism exemplified in the foregoing may be applied to a hand hovering gesture (e.g., with no finger shapes assumed to be detected).

By referring to FIG. 9, portion c) schematically shows a e.g., right-wise hand hovering.

In such case all the frames as possibly stored in the X node circular buffer (CBX) will have a quite constant trend profile for X1, X2, X3 over the various frames 91 . . . 100 as schematically represented in portions a) and b) of FIG. 9. In such an exemplary case, all X nodes will be almost equally excited for all frames, i.e. over time.

Portion c) of FIG. 10 again schematically shows an exemplary right-wise hand hovering.

In such case, the frames as possibly stored in the Y node circular buffer (CBY) will generally differ from one another as shown in portions a) and b) of FIG. 10. In such an exemplary case, the Y nodes will be excited differently for each frame, with excitation changing over time as a result of the hovering movement.

The calculation of the slant parameter considered in the foregoing will thus yield different results for the two axes X and Y.

In the case of the X axis, the nodes X1, X2 . . . , X16 may have the location of their maxima checked within the temporal window represented by the various CBX frames stored in the circular buffer 12 for the X axis. For each column in the buffer, the maximum value may be detected while locating its relative frame index.

The slant parameter for the X nodes may then be calculated e.g., based on the criteria discussed in the foregoing. In the specific example considered, the slant parameter for the X axis, e.g., SlantX is equal to 0 (or, more generally, may present values which remain below a given threshold) because all the X nodes are excited substantially equally during the hovering gesture.

Conversely, the same processing performed for the Y nodes will confirm that the CBY frames (that is the frames stored in the circular buffer 14 for the Y axis) will not show a constant trend as schematically represented in portion b) of FIG. 10: with, e.g., the first Y node Y1 reaching its maximum value at frame 91, the second node Y2 at frame 92, the third node Y3 at frame 93, and so on, e.g., with the maximum of the detection (sensing) signal going from lower Y index nodes to higher Y index nodes (in the exemplary case of right-wise hovering).

The corresponding value for the slant parameter, e.g., SlantY, will thus exhibit a trend over time which is not flat and have a non-zero value, e.g., a positive value.

FIGS. 11 and 12 are again exemplary of right-wise hovering along the Y axis, in the case of a finger gesture.

Figure 11:
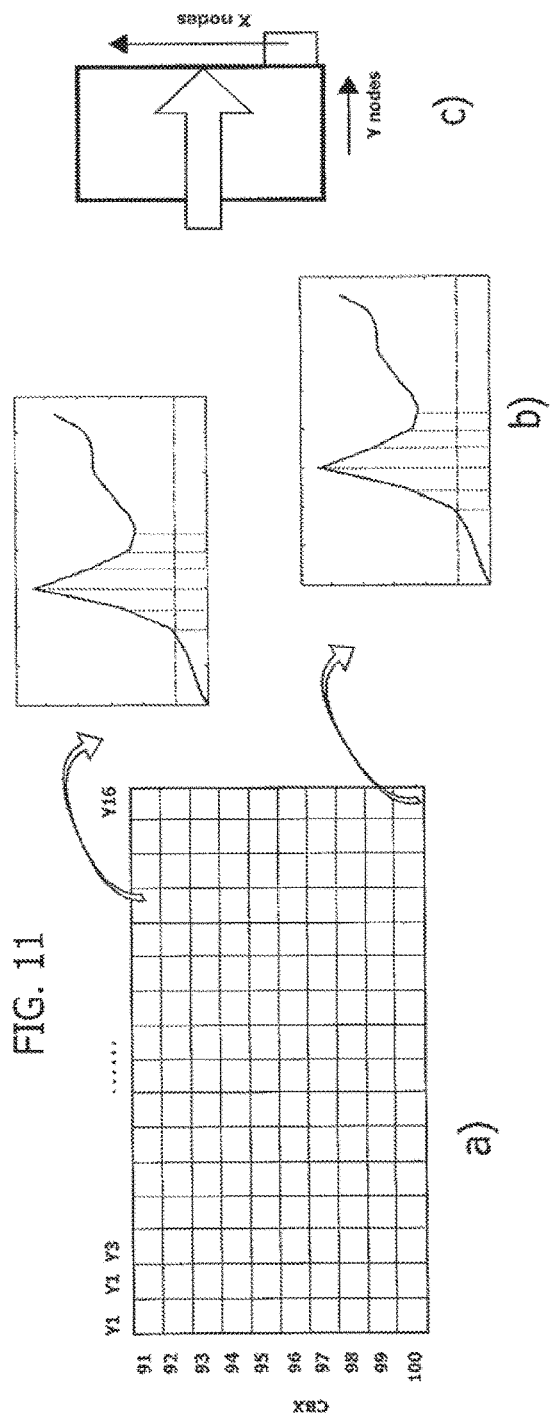
Figure 12:
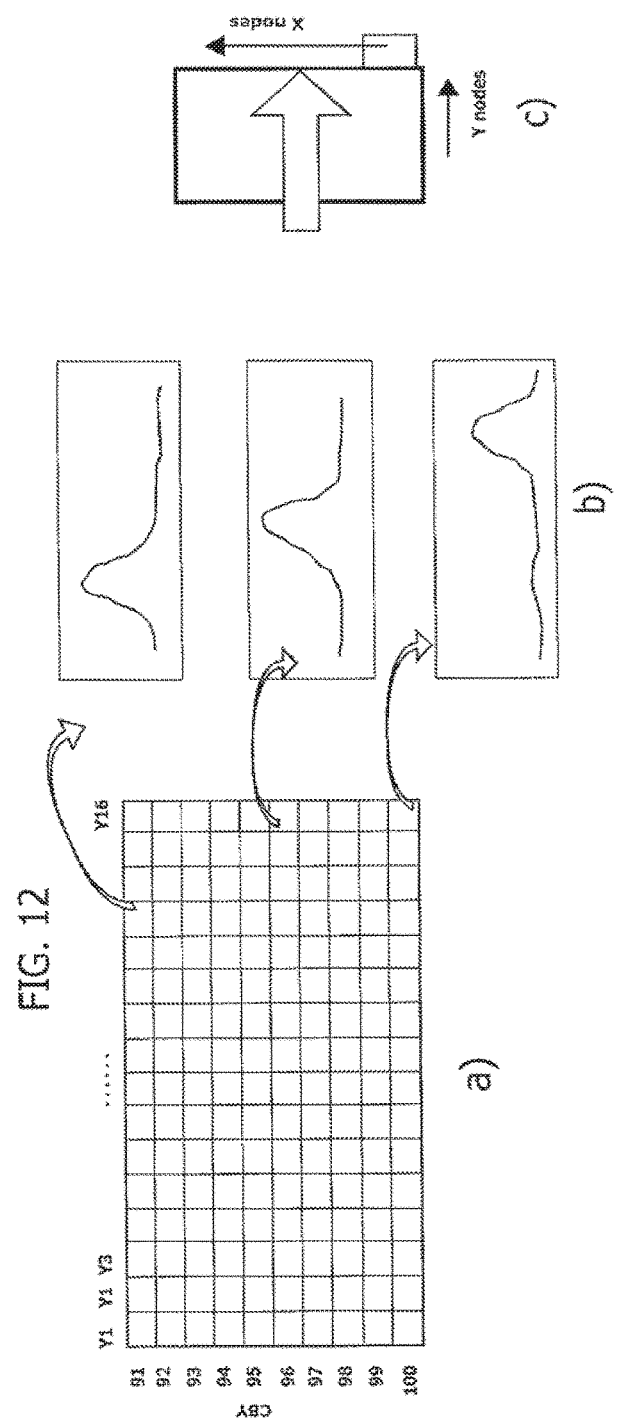

By way of direct comparison to the exemplary hand hovering gesture to which FIGS. 9 and 10 refer, it will be appreciated that in the exemplary case of finger hovering as represented in FIGS. 11 and 12, the frames both for the X axis (CBX) and for the Y axis (CBY) will exhibit a peaked, bell-like shape with the coordinate pair of the bell peak, which may be used as the coordinate pair for the finger: while a single finger gesture is considered for the sake of simplicity, the same basic principles may also apply to a multi-finger gesture.

In one or more embodiments, if a finger shape is detected in a frame (e.g., as better detailed in the following) its coordinates on the X axis or Y axis may be stored in the circular buffers 12 and 14 and the related signals may be formed along the same principles discussed in the foregoing for hand hovering.

For instance, by assuming a right-wise finger hovering gesture as schematically represented in portions c) of both FIGS. 11 and 12, the frames for the X axis will show a peak bell remaining essentially stable over time at the same node(s).

Again, in one or more embodiments, such stability may be checked against a given threshold so that hovering along a certain axis is not "declared" if the related parameters (e.g., the slant parameter discussed in the foregoing or similar parameter) remain in absolute value, under such a threshold, thus avoiding false positives due to finger shaking not intended to be a hovering gesture.

Conversely the sensing (e.g., capacitance) profiles from the panel S for the Y axis (as stored e.g., in the CBY buffer 14) may exhibit a behavior as schematically represented in portions a) and b) of FIG. 12, e.g., with a bell-shaped peak changing its position over time by moving from frame to frame.

In one or more embodiments, checking this changing position may permit determining the finger-hovering direction. For instance a finger peak moving from the Y1 node to the Y16 node while remaining substantially stationary for the X nodes may identify a right-wise finger hovering as schematically shown in portions c) of FIGS. 11 and 12.

In one or more embodiments, detecting a finger hovering gesture may involve calculating a slant parameter (e.g., SlantX, SlantY) as discussed in the foregoing for hand gestures. In one or more embodiments, a simpler processing may identify the presence/direction of hovering by simply comparing the position of a peak in a set of subsequent frames.

FIGS. 13 to 24 are exemplary of one or more embodiments for the singling out a finger gesture and possibly detecting a finger shape, e.g., for singling out such finger shape over a background as possibly represented by a "ghost" of the palm/fist of the hand to which the finger belongs.

In one or more embodiments, the exemplary solution described in the following may be adopted to perform, e.g., the step 102 in the flow chart of FIG. 5 (and—more generally—any other steps involving distinguishing a finger shape/gesture against a non-finger shape/gesture) in order to decide whether gesture detection should proceed towards steps 108 and 110 (hand gesture) or towards step 112 (finger gesture).

In that respect, one or more embodiments may involve a space transformation to perform finger shape detection/recognition even on a single frame.

Figure 13:
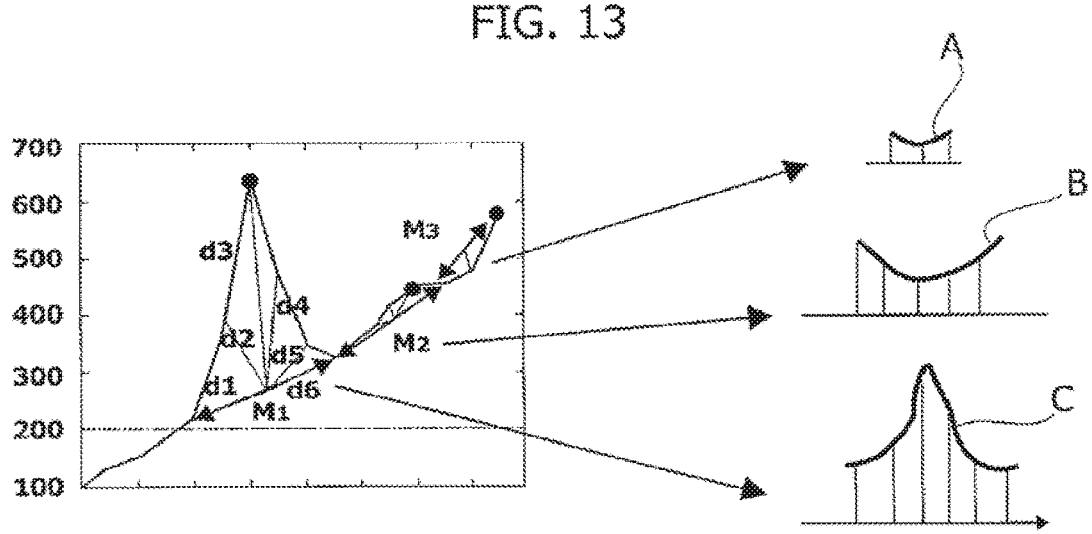

The left-hand side of FIG. 13 schematically shows an exemplary configuration of peaks and valleys in a sensing signal from the panel S for the various nodes in a frame (this may be a either an X-axis frame or an Y-axis frame) which, subject to a transformation to a node-distance representation (d1-d6, M1, M2, M3 as better detailed in the following), may enable "non-finger" shapes A and B to be distinguished from a "finger" shape C and vice-versa.

The transformation to the node-distance space exemplified in the following may be used, e.g., for determining whether a hand gesture or a finger gesture is being detected as exemplified in the flow chart of FIG. 5 for instance in revealing the direction or sense (up, down, right-wise, left-wise) of hovering gestures as previously described in connection with FIGS. 11 and 12.

One or more embodiments may, however apply, more generally, to any context where a finger shape may be distinguished over a non-finger shape in "raw" data (e.g., node capacitance) as produced by a sensing panel S such as a self-sensing display screen.

Figure 14:
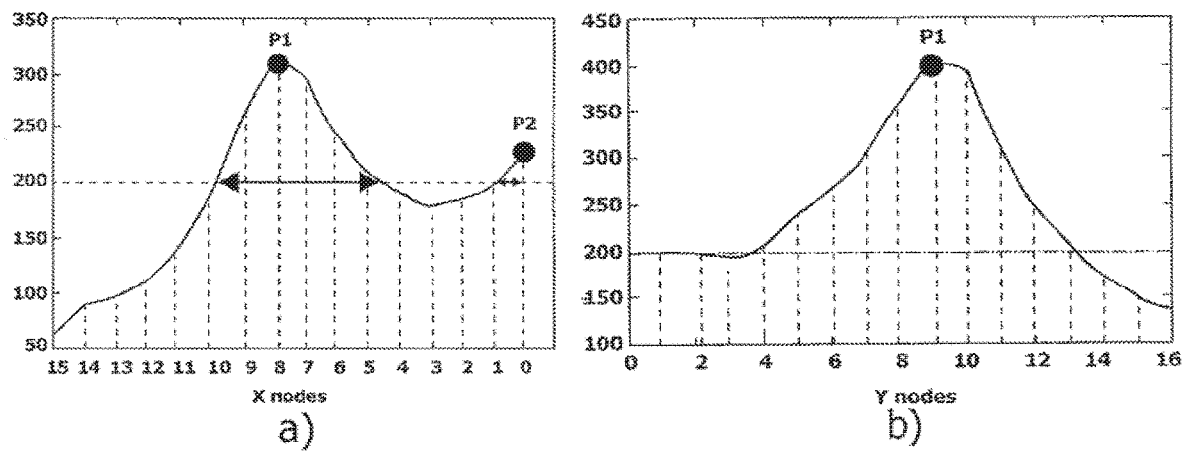

In one or more embodiments, as exemplified in FIG. 14, a preliminary analysis may be performed, for the X nodes (portion a) of FIG. 14) or for the Y nodes (portion b) of FIG. 14) at a given time t (e.g., for a given frame, possibly the latest, e.g., the newest frame stored in one of the circular buffers 12, 14) to detect the presence of peaks such as P1 and P2, in order to determine the number of peaks and identifying a set of "lower" nodes under each peak ("lower" nodes means nodes having a lower intensity of the detection (or sensing) signal, e.g., capacitance, than the peak.

In one or more embodiments, such analysis may be performed by applying an intensity threshold, e.g., at an arbitrary threshold value Th=200 as exemplified in FIG. 14.

In one or more embodiments, such threshold processing, if extended over a set of nodes (X-nodes and Y-nodes) defining a certain area of the surface of the sensing panel S over a minimum area may be easily adapted to detect the presence of a hand in the vicinity of the panel S.

In one or more embodiments, such threshold processing (wherein the threshold value may be made adaptive for certain applications), makes it possible to determine, e.g., that for a certain number of nodes (e.g., nodes 5 to 10 for the X nodes of portion a) nodes 4 to 13 for the Y nodes of portion b) of FIG. 14, the detection signal is in excess of the threshold, with one of these nodes being a peak node and the other nodes in the set "lying" under that peak.

Discriminating fingers from other shapes by only considering, e.g., the number of nodes lying under a given peak may be difficult or turn out to be an unreliable determination.

For instance, e.g., two peaks may overlie a same number of nodes with their shapes deriving from two different sources such as a finger and a "ghost" of the corresponding palm/fist.

FIG. 15 shows, again with respect to an X-axis (portion a) and a Y-axis (portion b) an exemplary case of a finger pointing to a sensing panel S with a strong presence of a palm/fist ghost.

Figure 15:
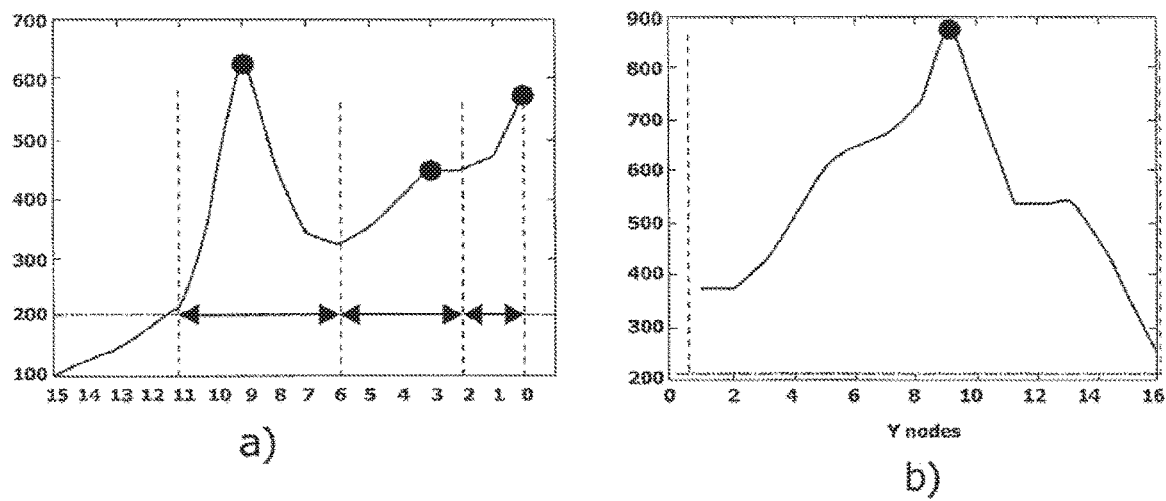

Portion a) of FIG. 15 shows a possible detection profile related to three groups of nodes, e.g., from left to right, a finger pointing to the screen plus a palm/fist ghost.

Portion b) of FIG. 15 shows a corresponding detection profile for the Y nodes, which profile exhibits only one peak and only one group of nodes lying under that peak.

Figure 16:
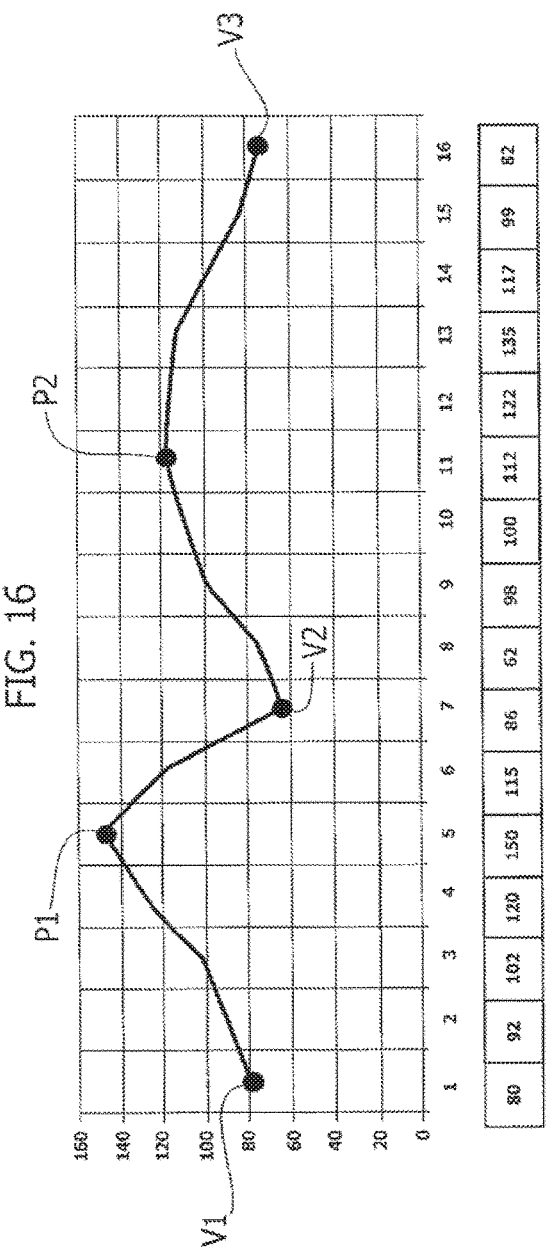
FIGS. 16 to 18 are exemplary diagrams of finger detection in embodiments, FIG. 19, including two parts designated a) and b) is exemplary of space transformation for use in finger detection in embodiments.
Figure 18:
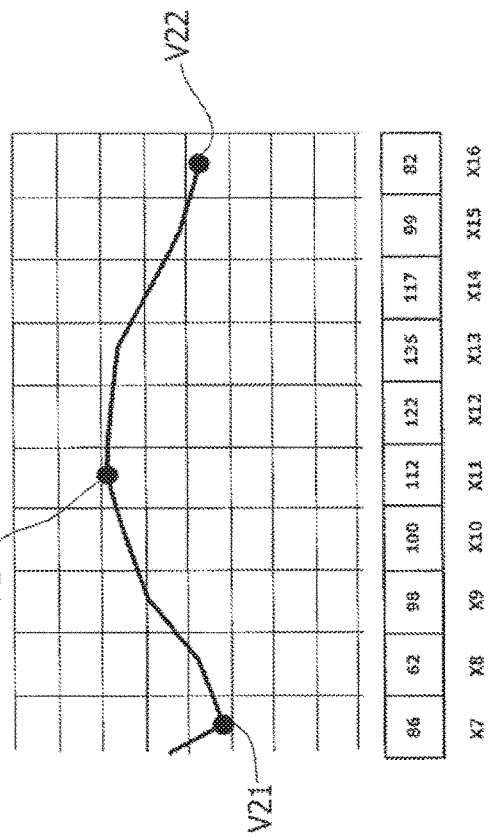
Figure 17:
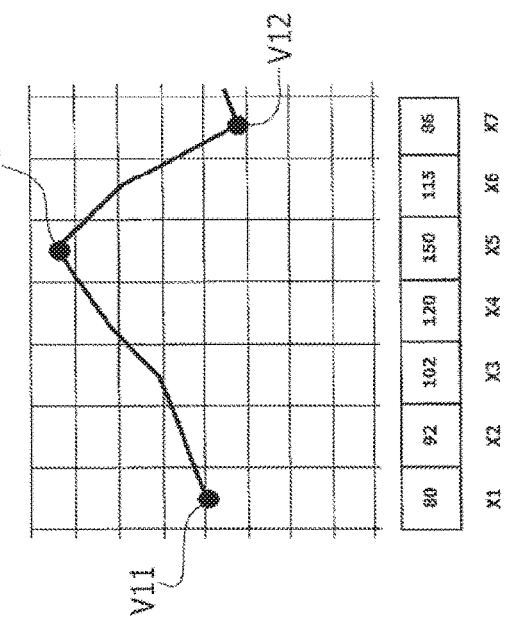

FIGS. 16 to 18 (these being applicable both to X nodes and Y nodes) expand on this exemplary case by showing an intensity (e.g., capacitance) detection profile versus an abscissa scale representative of the nodes, e.g., X1 to X16 or Y1 to Y16, such a profile including two peaks P1, P2 and three valley V1, V2 and V3.

FIGS. 17 and 18 show that such a detection profile may be regarded as composed of a first peak (e.g., peak P1) located between two neighboring valleys V11 (=V1 of FIG. 16) and V12 (=V2 of FIG. 16) plus a second peak (e.g., P2) located between two neighboring valleys V21 (=V2 of FIG. 16) and V22 (=V3 of FIG. 16). FIGS. 17 and 18 are thus representative of the possibility of representing a detection profile as a set of individual peaks (e.g., P1, P2) each located between two neighboring valleys (e.g., V11, V12; V21, V22).

Such a peak/valley arrangement described in terms of node-intensity (e.g., capacitance) space may not be able to reliably discriminate a finger shape against a non finger shape (e.g., a palm/fist ghost).

Figure 19:
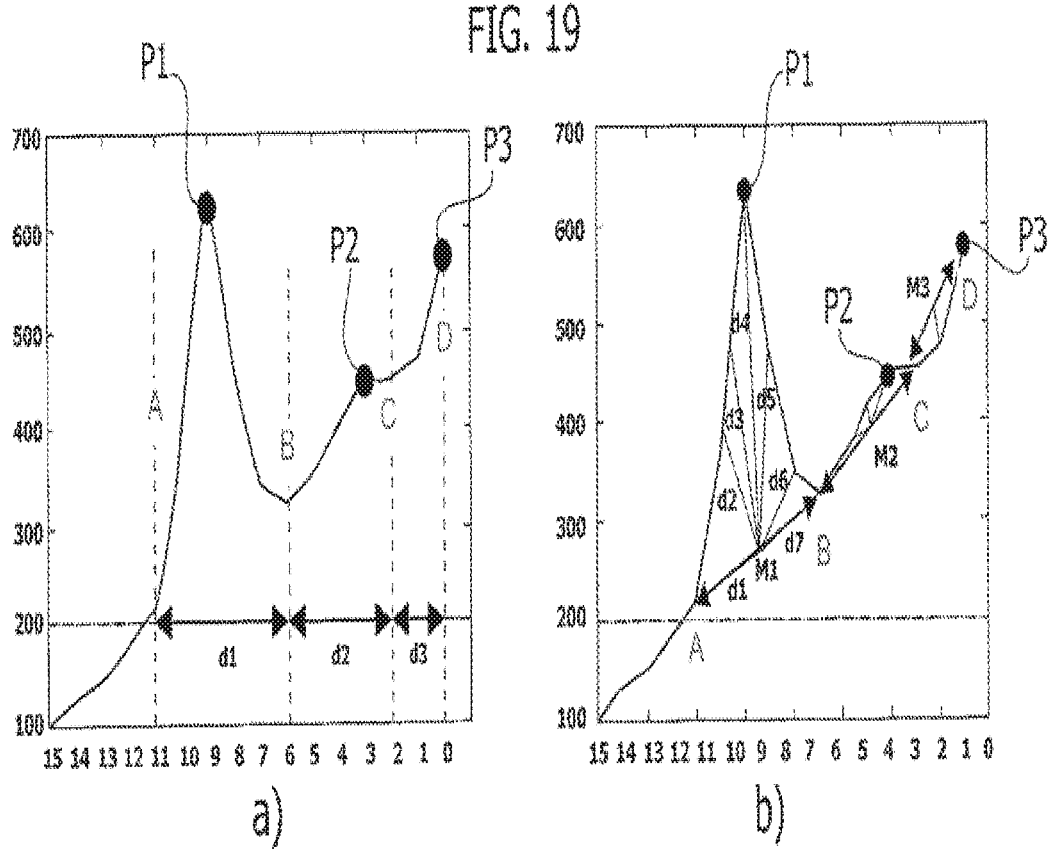

One or more embodiments may overcome such a drawback by resorting to a space transformation as schematically represented in FIG. 19.

In the left-hand portion a) of FIG. 19 an exemplary detection profile as considered in the foregoing is shown including three peaks P1, P2, P3. Each of these peaks may be represented as shown in FIGS. 17 and 18 as being located between two adjacent valleys (e.g., A and B for peak P1, B and C for peak P2 and C and D for peak P3, where D is both a peak and a valley, i.e., D denotes a peak that overlaps a valley because P3 is an endpoint but also is the point with the greatest magnitude after the valley C), the distance between adjacent valleys defining a widths d1, d2, d3 of the peaks P1, P2, P3, respectively.

As schematically represented in portion b) of FIG. 19, for each peak P1, P2, P3 a mean (average) point M1, M2, M3 may be defined between the two valleys for each peak (e.g., A and B for peak P1, B and C for peak P2 and C and D for peak P3).

In the exemplary case of FIG. 19 the mean/average points are thus M1 (for peak P1), M2 (for peak P2) and M3 (for peak P3), each of these mean points having the same distance to the two valleys neighboring the relative peak (e.g., A and B for peak P1, B and C for peak P2, and C and D for peak P3).

In one or more embodiments the mean/average nature of points such as M1, M2, M3 may be in the form of an Euclidean distance in terms of the node location and in terms of detection (or sensing) intensity, such as, e.g., capacitance value.

In one or more embodiments, distances (e.g., Euclidean) di of the intensity (capacitance) value f(i) for each node I=1, 2, ... in the peak to the mean/average point M1 previously identified may be calculated.

For instance (by referring for the sake of simplicity only to the peak P1 with the mean point M1 between points A and B), e.g., Euclidian distances may be defined per each of the seven points for the peak in question and the point M1, thus defining for each of these points a distance di between the point in question and the medium point M1 with I=1, ..., 7.

In one or more embodiments, a corresponding mathematical formula for di may be:

$$d_i = [(M1_x - V_{ix})^2 + (M1_y - V_{iy})^2]^{1/2}$$

where $$M1_x = (\min(B_x, A_x) + |B_x - A_x|/2)$$

$$M1_y = (\min(B_y, A_y) + |B_y - A_y|/2)$$

$V_{ix} = f(i)$
$V_{iy}$ = node location/coordinate
f(i) is the detection or sensing intensity (e.g., capacitance) value for the node i with I=1, ..., N,
N is the number of nodes in the peak considered (here N=7, including the node having the peak value), and where the expression for $d_i$ is derived from the Pythagorean Theorem.

For example, referring to FIG. 19(a), $A_x \approx 210$, $A_y = 11$, $B_x \approx 330$, $B_y = 6$, $M1_y = 8.5$, $M1_x = 270$; therefore, $d_2$ (from FIG. 19(b))=$\sqrt{(270-460)^2 + (8.5-10)^2}$=190.

Figures 20, 21, 22:
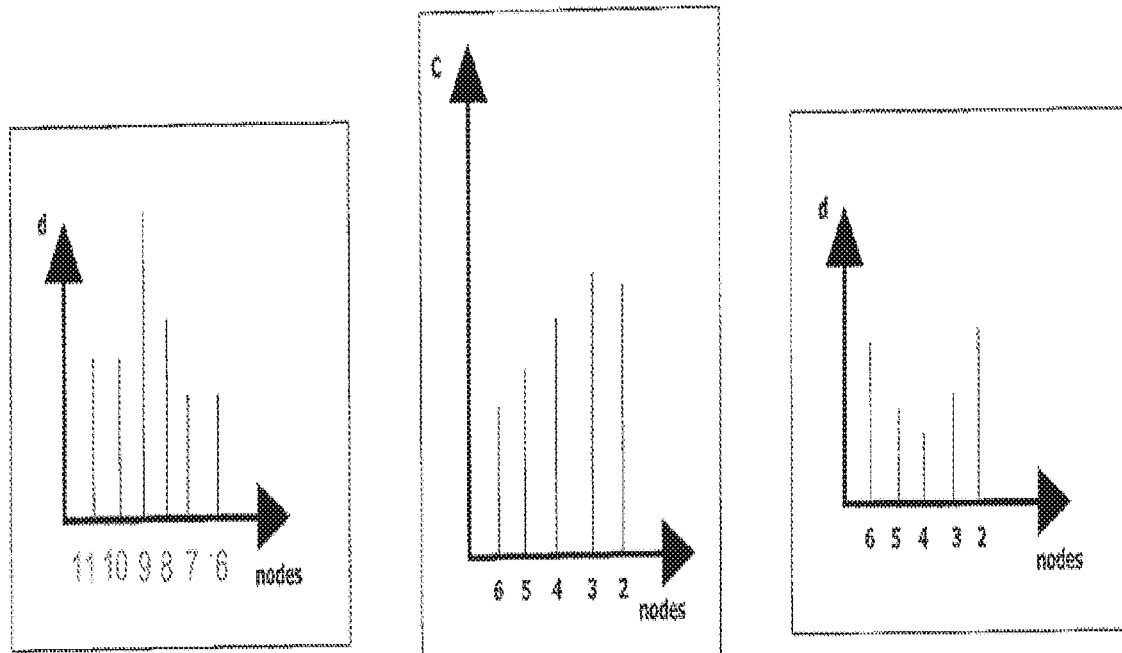
FIGS. 20 to 22 are exemplary of the results obtainable with the space transformation of FIG. 19, and FIGS. 23 and 24 are exemplary of the possible use of such results in embodiments.

The values of the distances thus calculated may be plotted for the various nodes as schematically represented in FIGS. 21 and 22.

Specifically FIGS. 20, 21 and 22 are exemplary representations of:
the peak P1 in the leftmost position in FIG. 19 as represented in the transformed node-distance space,
the peak P2 in the center position in FIG. 19 as represented in the original node-intensity (e.g., capacitance) space, and
the same peak P2 in the transformed node-distance space.

Peak P1 (which, in the exemplary case, is held to correspond to a finger pointing in the panel S) preserves its peaked bell-like shape also in the transformed space. Conversely, the just slightly peaked shape of peak P2 in the node-intensity space (FIG. 21) maps into a valley-like shape when represented in the node-distance space (FIG. 22).

Even without wishing to be bound to any specific theory in that respect, it may be appreciated that the representation in the node-distance space may correspond to a sort of "polar" representation of the distances of the detection intensity for the various nodes to the medium point in the peak (e.g., M1, M2 or M3). In such a polar-like representation, a marked peak corresponding to a finger pointing at the panel S will substantially maintain its peaked shape, while less prominent shapes as possibly produced by palm/fist ghosts will have their shapes transformed into substantially flat or even concave (e.g., valley-like) shapes in the transformed node-distance space.

Figure 23:
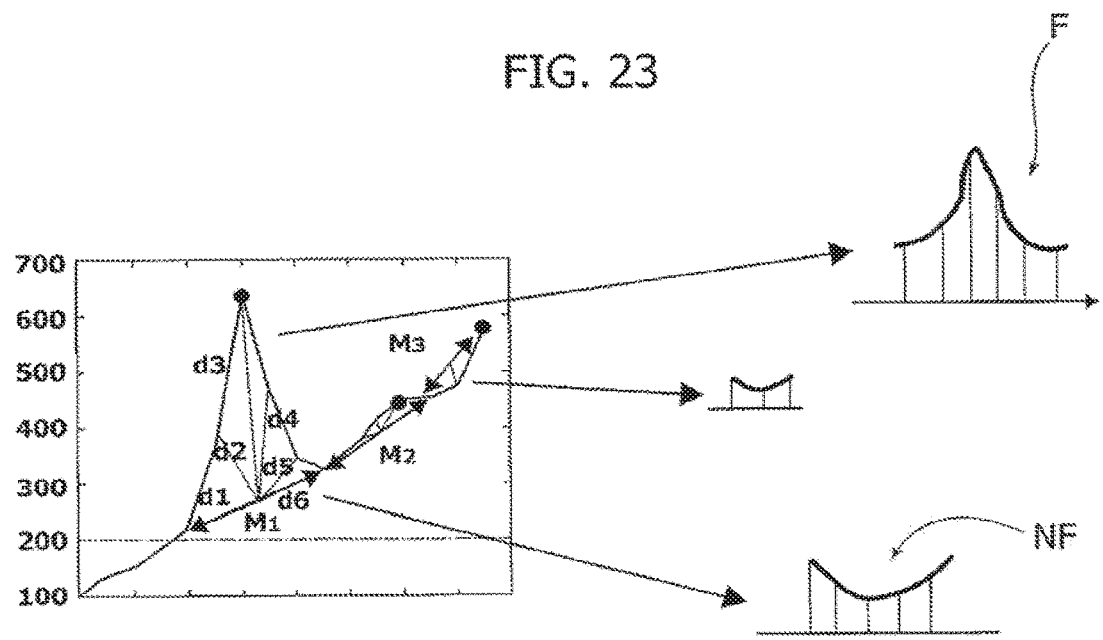
Figure 24:
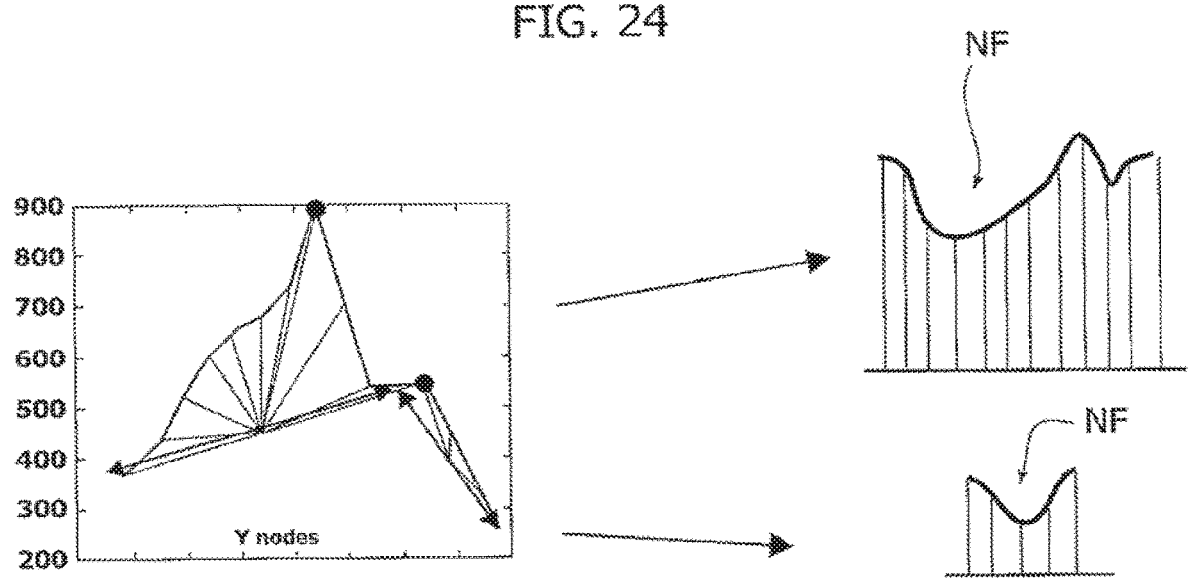

FIGS. 23, 24 schematically show, in connection with both X nodes and Y nodes, that any related processing (as easily adapted to be implemented in a processor such as processor 10) involving a comparison of neighboring values for the various nodes will make it possible to distinguish "finger" shapes F—e.g., shapes highly likely to correspond to finger(s) pointing at the panel) over "non-finger" shapes NF—e.g., shapes highly likely to derive from a ghost, such as a palm or fist ghost) designated NF in FIGS. 23 and 24.

In one or more embodiments, the related information (F=finger, NF=non-finger) may be processed in a combined manner with respect to the two axes to reliably distinguish finger shapes from non-finger shapes, e.g., for hand/finger hovering detection as disclosed in the foregoing.

FIGS. 13 to 24 are thus exemplary of one or more embodiments of a method of recognizing finger shapes in at least one of a X-node and a Y-node sensing signal X, Y produced by a gesture sensing panel (e.g., a self-sensing capacitive display screen) panel S, the sensing signals X, Y being indicative of the presence of a hand feature at corresponding row (line) or column locations of the sensing panel S (e.g., in the proximity space to the panel S or—possibly—in contact with the panel S).

In one or more embodiments the method may involve detecting the presence—in the detection signal for at least one of the X-node and Y-node sensing signals X, Y—of at least one peak, e.g., P1, P2, P3 located between a pair of valleys (e.g., V11, V12; V21, V22; A, B; B, C; C, D) the peak having a set of underlying detection nodes—e.g., including the peak node—between the pair of valleys; a mean (average) point M1, M2, M3 between the pair of valleys is determined by computing, for the detection nodes in the set, distances (e.g., Euclidean) of the respective values of the detection signal to the mean point M1, M2, M3 between the pair of valleys. By plotting the distances thus computed against the nodes for which the distances were calculated, in one or more embodiments one may then:
i) if the plot exhibits a peaked shape (see e.g., FIG. 20), recognize a finger shape; and
ii) if the plot fails to exhibit a peaked shape (see e.g., FIG. 22), recognize a non-finger shape.

In one or more embodiments the processing exemplified in connection with FIGS. 13 to 24 may also apply to detecting multi-finger shapes, that is finger shapes involving plural fingers e.g., for detecting "pinch", rotation, zoom-in/zoom-out gestures and the like.

Any of the above-described embodiments may be performed in hardware, software, or a combination of hardware and software, where the software may be in the form of instructions that are executed by a computing circuit such as a microprocessor or a microcontroller.

Without prejudice to the underlying principles of the disclosure, the details and embodiments may vary, even significantly, with respect to what has been described herein for purely exemplary purposes, without departing from the spirit and scope of the disclosure.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A method of detecting object hovering gestures over a sensing panel, the method comprising:
   generating X-node sensing signals and Y-node sensing signals based upon detection of an object gesture in a proximity space of a sensing panel, the X-node and Y-node sensing signals being indicative the detection of an object hovering over a corresponding location on the sensing panel in a first dimension of the sensing panel associated with the X-node sensing signals and in a second dimension of the sensing panel associated with the Y-nodes;
   capturing groups of generated X-node sensing signals and groups of Y-node sensing signals over time, each group of generated X-node sensing signals and each group of Y-node sensing signals being captured a given time to define a frame from the sensing panel and a plurality of frames being captured over a time window;
   detecting locations of maxima of the X-node and Y-node sensing signals by detecting locations of maxima for the plurality of frames over the time window; and
   detecting a touchless object hovering gesture over the sensing panel if the detected locations of the maxima change over the plurality of captured frames for one of the X-node and Y-node sensing signals while not changing over the plurality of captured frames for the other one of the X-node and Y-node sensing signals.

2. The method of claim 1, wherein detecting an object hovering gesture further comprises detecting an object hovering gesture as having occurred in a direction associated with the first dimension or the second dimension based upon whether the locations of the maxima of the X-node sensing signals or the Y-node sensing signals change over the time window.

3. The method of claim 1 further comprising determining for the X-node and Y-node sensing signals a slant parameter as a function of a frame index indicative of the frame containing a maximum at a node defined by the corresponding to the X-node and Y-node sensing signals, the slant parameter having a magnitude and a indicative of an object hovering gesture.

4. The method of claim 3 further comprising:
   comparing frame indexes of adjacent nodes;
   increasing a value of the slant parameter if a current frame index is lower than a next frame index;
   decreasing the value for the slant parameter if the current frame index is higher than the next frame index; and
   leaving unchanged the value for the slant parameter if the current frame index is identical to a next frame index.

5. The method of claim 1, wherein detecting an object hovering gesture further comprises comparing locations of the maxima of groups of X-node and Y-node sensing signals against a displacement threshold and determining the locations of the maxima have not changed the comparing indicates a difference of less than the displacement threshold.

6. The method of claim 5 further comprising comparing the magnitude of the slant parameter against a hovering threshold and detecting an object hovering if the hovering threshold is reached.

7. The method of claim 1 further comprising:
   checking the groups of X-node and Y-node sensing signals of the plurality of frames over the time window for the presence of at least one finger shape; and
   recognizing the object hovering gesture as a hand hovering gesture if the checking indicates the absence of finger shapes in the groups of X-node and Y-node sensing signals of the plurality of frames.

8. A method of recognizing gestures in the proximity space of a sensing panel from X-node and Y-node sensing signals indicative of the presence of a hand feature at corresponding row locations and column locations of the sensing panel, the method including:
   detecting locations of maxima of said X-node and Y-node sensing signals by detecting locations of maxima for a plurality of frames over a time window for a set of X-node sensing signals and for a set of Y-node sensing signals,
   recognizing a hovering gesture of said hand feature if the locations of the maxima detected vary over said plurality of frames for one of said sets of X-node and Y-node sensing signals while remaining stationary over said plurality of frames for the other of said sets of X-node and Y-node sensing signals.

9. The method of claim 8, including recognizing said hovering gesture as taking place in the direction of the nodes for which the locations of the maxima vary over said plurality of frames.

10. The method of claim 9, including recognizing said hovering gesture as taking place in the sense of displacement of the nodes for which the locations of the maxima vary over said plurality of frames.

11. The method of claim 10 further including determining for said X-node and said Y-node sensing signals a slant parameter as a function of a frame index indicative of the frame at which a maximum is located at a certain node in said X-node and Y-node sensing signals, wherein the method includes comparing frame indices of adjacent nodes, and
   if a current frame index is lower than a next one, increasing the value for the slant parameter;
   if a current frame index is higher than a next one, decreasing the value for the slant parameter; and
   if the current index is identical to a next one leaving unchanged the value for the slant parameter,
   whereby the magnitude and the sign of said slant parameter are indicative of a hovering gesture and the sense thereof.

12. The method of claim 8 further including comparing the locations of the maxima of said sets of X-node and Y-node sensing signals against a displacement threshold, and evaluating said locations of the maxima as remaining stationary if said displacement threshold is not reached.

13. The method of claim 12 further including comparing the magnitude of said slant parameter against a hovering threshold, and determining hovering if such a threshold is reached.

14. The method of claim 13 further including:
   checking said sets of X-node and Y-node sensing signals for said plurality of frames over a time window for the presence of at least one finger shape,
   in the absence of finger shapes in said sets of X-node and Y-node sensing signals for said plurality of frames over a time window, recognizing said hovering gesture as a hand hovering gesture.

15. The method of claim 8 further including:
   providing circular buffers for storing respective sets of X-node sensing signals and Y-node sensing signals detected for a plurality of frames over a certain time window, and
   discarding an oldest sensing signal from the buffer when a new sensing signal is loaded in the buffer.

16. The method of claim 8 further including at least one of:
- selecting said sets of X-node sensing signals and Y-node sensing signals of approximately sixteen sensing nodes; and
- selecting said plurality of frames to include about ten frames.

17. A non-transitory computer-readable medium storing instructions that, when executed by a computing apparatus, cause the computing apparatus, or another apparatus under control of the computing apparatus:
- to track first values over a time period, the first values each corresponding to a respective first region of a sense screen, the first regions aligned with a first dimension of the sense screen;
- to detect locations of maxima of the first values for a plurality of frames of sensed data for the sense screen over a time window;
- to track second values over the time period, the second values each corresponding to a respective second regions of the sense screen, the second regions aligned with a second dimension of the sense screen;
- to detect locations of maxima of the second values for the plurality of frames of sensed data for the sense screen over the time window; and
- to detect a touchless object gesture over the sense screen in response to the locations of the maxima of the first values changing over the time period and the locations of the maxima of the second values not changing over the time period; and
- to detect a touchless object gesture over the sense screen in response to to the locations of the maxima of the second values changing over the time period and the locations of the first values not changing over the time period.

18. The non-transitory computer-readable medium of claim 17, further storing instructions that, when executed by the computing apparatus, cause the computing apparatus, or another apparatus under control of the computing apparatus, to detect the touchless object gesture corresponding to a portion of a hand moving over the sense screen without any portion of the hand contacting the sense screen.

19. The non-transitory computer-readable medium of claim 17, further storing instructions that, when executed by the computing apparatus, cause the computing apparatus, or another apparatus under control of the computing apparatus, to detect a direction of the object gesture in response to a direction in which one of the locations of the maxima of the first values and the locations of the maxima of the second values moves over the time period.

20. The non-transitory computer-readable medium of claim 17, further storing instructions that, when executed by the computing apparatus, cause the computing apparatus, or another apparatus under control of the computing apparatus, to detect the touchless object hovering gesture as having occurred in a direction associated with the first dimension or the second dimension based upon whether the locations of the maxima of the X-node sensing signals or the Y-node sensing signals change over the time window.

* * * * *